US010590660B2

(12) United States Patent
Keene et al.

(10) Patent No.: US 10,590,660 B2
(45) Date of Patent: Mar. 17, 2020

(54) MORTAR BED GAUGE DEVICE, SYSTEM, AND METHOD

(71) Applicant: Keene Building Products Co., Inc., Mayfield Heights, OH (US)

(72) Inventors: James R. Keene, Pepper Pike, OH (US); James A. Keene, Cleveland Heights, OH (US)

(73) Assignee: KEENE BUILDING PRODUCTS CO., INC., Cleveland, OH (US)

( * ) Notice: Subject to any disclaimer, the term of this patent is extended or adjusted under 35 U.S.C. 154(b) by 90 days.

(21) Appl. No.: 15/297,185

(22) Filed: Oct. 19, 2016

(65) Prior Publication Data

US 2017/0108325 A1   Apr. 20, 2017

Related U.S. Application Data

(60) Provisional application No. 62/243,166, filed on Oct. 19, 2015.

(51) Int. Cl.
*E04F 15/02*     (2006.01)
*B32B 3/30*      (2006.01)
(Continued)

(52) U.S. Cl.
CPC ............ *E04F 15/0215* (2013.01); *B32B 3/18* (2013.01); *B32B 3/30* (2013.01); *B32B 5/022* (2013.01); *B32B 5/08* (2013.01); *B32B 5/26* (2013.01); *B32B 7/06* (2013.01); *B32B 7/12* (2013.01); *B32B 11/042* (2013.01); *B32B 11/10* (2013.01); *B32B 13/04* (2013.01); *B32B 21/14* (2013.01); *E04F 15/182* (2013.01); *E04F 15/186* (2013.01); *B32B 2250/05* (2013.01);
(Continued)

(58) Field of Classification Search
CPC ... E04F 15/0215; E04F 15/182; E04F 15/186; B32B 3/18; B32B 11/042; B32B 5/08; B32B 5/26; B32B 21/14; B32B 13/04; B32B 11/10; B32B 7/12; B32B 7/06; B32B 3/30; B32B 2262/023; B32B 2250/05; B32B 2471/00; B32B 2307/718; B32B 2307/58; B32B 2307/10; B32B 2262/14; B32B 2262/101; B32B 2262/0276; B32B 2262/0261; B32B 2262/0253; B32B 2262/0238; B32B 2419/04; G01B 5/06
See application file for complete search history.

(56) References Cited

U.S. PATENT DOCUMENTS 7,096,630 B1 * 8/2006 Keene ..................... E02D 19/00
2006/0201092 A1 * 9/2006 Saathoff .................. E04F 13/00
                                                         52/385
(Continued)

*Primary Examiner* — Jennifer A Steele
(74) *Attorney, Agent, or Firm* — Renner, Otto, Boisselle & Sklar, LLP

(57) ABSTRACT

The present disclosure provides a mortar bed gauge device, system, and method that create a predetermined mortar bed thickness. The mortar bed gauge device includes a web of extruded polymer monofilaments having indentations on a surface of the web. The mortar bed gauge system includes the web located between a substrate layer and a finish layer. The mortar bed gauge method includes supplying the web, laying the web onto the substrate layer, placing a mortar composition onto the web, and measuring the amount of composition being placed on the web by the thickness of the web.

14 Claims, 3 Drawing Sheets

(51) Int. Cl.
*B32B 7/06* (2019.01)
*B32B 7/12* (2006.01)
*B32B 21/14* (2006.01)
*B32B 13/04* (2006.01)
*E04F 15/18* (2006.01)
*B32B 3/18* (2006.01)
*B32B 5/08* (2006.01)
*B32B 5/02* (2006.01)
*B32B 11/04* (2006.01)
*B32B 11/10* (2006.01)
*B32B 5/26* (2006.01)

(52) U.S. Cl.
CPC . *B32B 2262/023* (2013.01); *B32B 2262/0238* (2013.01); *B32B 2262/0253* (2013.01); *B32B 2262/0261* (2013.01); *B32B 2262/0276* (2013.01); *B32B 2262/101* (2013.01); *B32B 2262/14* (2013.01); *B32B 2307/10* (2013.01); *B32B 2307/58* (2013.01); *B32B 2307/718* (2013.01); *B32B 2419/04* (2013.01); *B32B 2471/00* (2013.01)

(56) References Cited

U.S. PATENT DOCUMENTS

| | | | |
|---|---|---|---|
| 2006/0228963 A1* | 10/2006 | Souther | B32B 5/02 |
| 2009/0218030 A1* | 9/2009 | LaVietes | E04F 15/00 |
| 2010/0055405 A1* | 3/2010 | Schlueter | E04F 15/182 |
| | | | 428/156 |
| 2012/0096791 A1* | 4/2012 | Cashin | E04D 5/10 |
| 2014/0170916 A1* | 6/2014 | Krasnoff | E04C 5/07 |
| | | | 442/58 |
| 2014/0202099 A1* | 7/2014 | Boyle | E04F 15/0244 |
| 2016/0369511 A1* | 12/2016 | Sandhar | E04D 12/00 |

* cited by examiner

MORTAR BED GAUGE DEVICE, SYSTEM, AND METHOD

This application claims the benefit under 35 U.S.C. § 119(e) to U.S. Provisional Application No. 62/243,166 filed on Oct. 19, 2015. The application is incorporated herein by reference in its entirety.

TECHNICAL FIELD

The present disclosure relates generally to a mortar bed, and more particularly to a mortar bed gauge device, system, and method that include a web of extruded polymer monofilaments having indentations on a surface of the web.

BACKGROUND

Surface coverings, particularly decorative finished flooring products, often require an underlayment to be installed over a structural wood subfloor or other substrate. Commonly, the underlayment is attached to the substrate by application of an adhesive, nails, screws, staples or any combination thereof. The underlayment serves as a foundation for the application of the surface coverings, and provides a clean, smooth surface upon which to lay the surface coverings. The required thickness of the underlayment is determined by the type of finished flooring product being installed and the amount of deflection in the subfloor.

SUMMARY

The present disclosure provides a mortar bed gauge device, system, and method that create a predetermined mortar bed thickness. The mortar bed gauge device includes a web of extruded polymer monofilaments having indentations on a surface of the web. The mortar bed gauge system includes the web located between a substrate layer and a finish layer. The mortar bed gauge method includes supplying the web, laying the web onto the substrate layer, placing a mortar composition onto the web, and measuring the amount of composition being placed on the web by the thickness of the web.

In accordance with one aspect of the present disclosure, a mortar bed gauge device includes: a web of extruded polymer monofilaments having top and bottom oppositely disposed surfaces and a pair of respective axes orthogonal to one another and extending in a plane parallel to the top and bottom oppositely disposed surfaces, the polymer monofilaments being heat welded at junctions to form a matrix of tangled monofilaments; and a plurality of indentations extending downwardly from the top surface of the web and along the respective axes, wherein the web is configured to provide a gauge area for establishing the thickness of a mortar bed.

In one embodiment, the polymer monofilaments are made of a material selected from polyolefin, polyamide, polyester, polyvinylhalide, polystyrene, polyvinylester, or a mixture of two or more thereof.

In another embodiment, the polymer monofilaments are made of a material selected from polyethylene, polypropylene, or a mixture of two or more thereof.

In another embodiment, the polymer monofilaments have an average diameter in the range from 1 mil to 4 mils.

In another embodiment, the web has a thickness in the range of 0.05 inch to 0.25 inch.

In another embodiment, the plurality of indentations have equal axial widths extending along each of the respective axes.

In another embodiment, the axial width of each of the plurality of indentations along each of the respective axes is in the range of 0.5 inch to 2 inches.

In another embodiment, the plurality of indentations are equally axially separated from one another along each of the respective axes.

In another embodiment, an axial distance along each of the respective axes from one of the plurality of indentations to another of the plurality of indentations is in the range of 0.5 inch to 2 inches.

In another embodiment, the plurality of indentations have equal depths.

In another embodiment, each of the plurality of indentations has a depth in the range of 0.1 inch to 0.5 inch.

In another embodiment, the device further includes a backing attached to the bottom surface of the web to form a flexible unit.

In another embodiment, the backing includes a fabric.

In another embodiment, the fabric includes a plurality of fiberglass strands.

In another embodiment, the backing includes rubber, polyvinyl chloride, bitumen, or a mixture of two or more thereof.

In another embodiment, the flexible unit is a roll material.

In another embodiment, the roll material has at least one selvedge edge extending along one of the respective axes.

In another embodiment, the device is installed in a mortar bed gauge system of the building.

In another embodiment, the mortar bed gauge system includes a substrate layer facing the bottom surface of the web and a finish layer facing the top surface of the web.

In accordance with another aspect of the present disclosure, a mortar bed gauge system includes: a web of extruded polymer monofilaments having top and bottom oppositely disposed surfaces and a pair of respective axes substantially orthogonal to one another and extending in a plane parallel to the top and bottom oppositely disposed surfaces, the polymer monofilaments being heat welded at junctions to form a matrix of tangled monofilaments; a plurality of indentations extending downwardly from the top surface of the web and along the respective axes; a substrate layer facing the bottom surface of the web; a finish layer facing the top surface of the web; and a first mortar layer located between the web and the finish layer.

DETAILED DESCRIPTION

Figure 1:
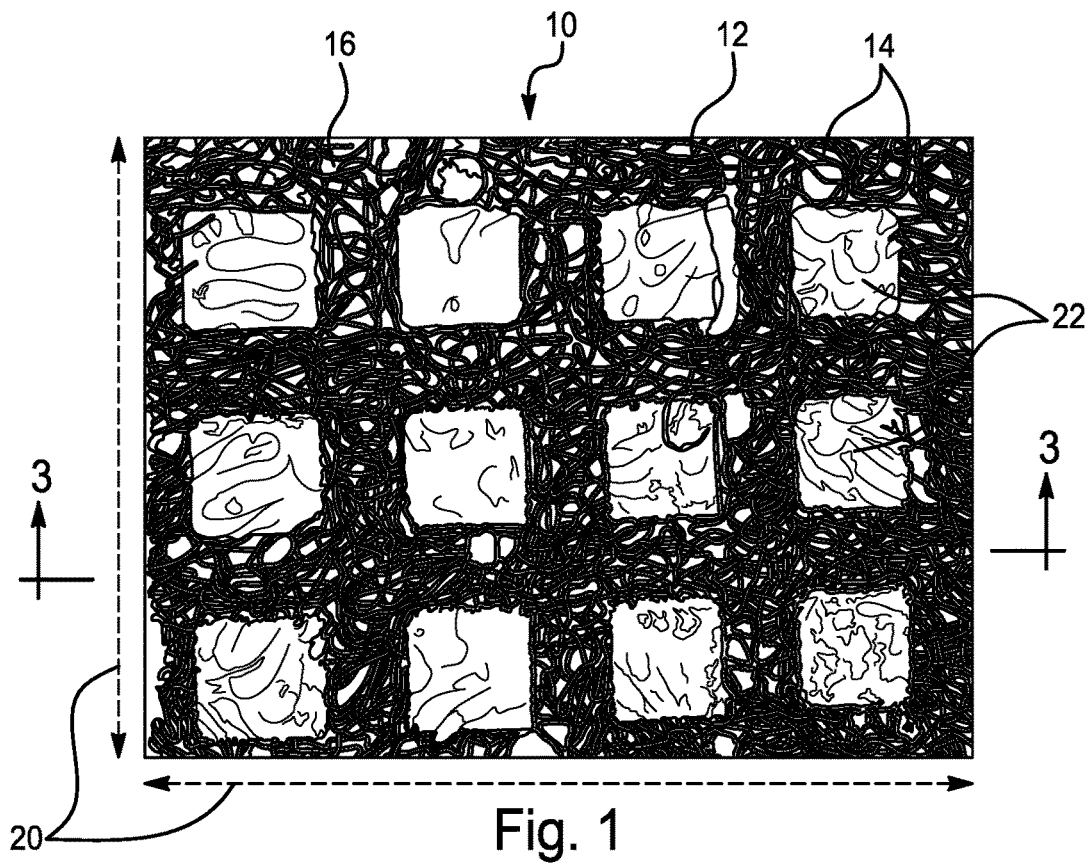
FIG. 1 is a plan view of an exemplary mortar bed gauge device according to the disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

An exemplary mortar bed gauge device includes a web of extruded polymer monofilaments. The polymer monofilaments are heat welded at junctions to form a matrix of tangle monofilaments. The web is a resilient, open structure that serves as mortar reinforcement and as a gauge to provide a predetermined mortar bed thickness corresponding to the preselected thickness of the web. The device may be included in a mortar bed gauge system between a finish layer and a substrate layer. The device may be installed between a finish layer and a substrate layer as a mortar bed gauge method.

Figure 2:
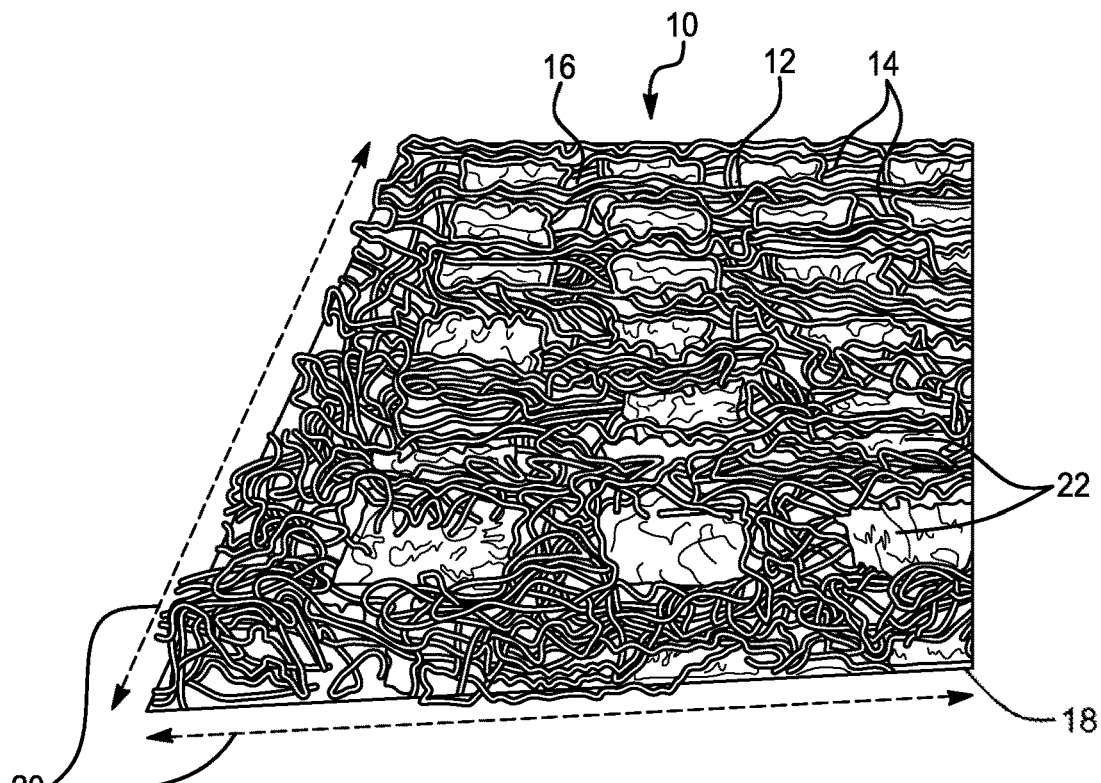
FIG. 2 is an oblique view of the device of FIG. 1.
Figure 3:
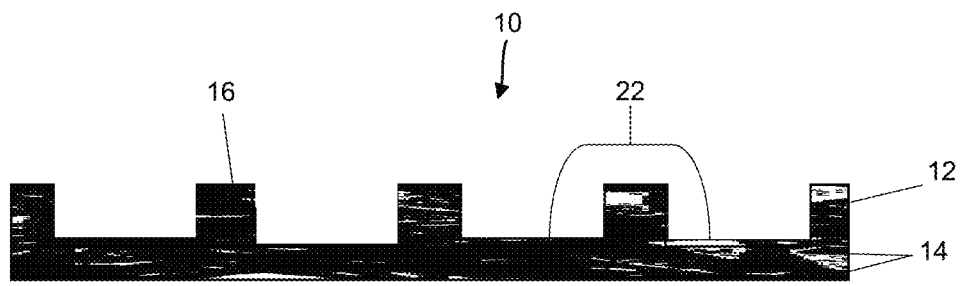
FIG. 3 is a cross section taken along line 3-3 in FIG. 1.

Referring now in detail to the drawings, and initially to FIGS. 1-3, a mortar bed gauge device is shown at 10. The depicted device 10 includes a web 12 of extruded polymer monofilaments 14. The monofilaments 14 are heat welded at junctions to form a matrix of tangled monofilaments 14. The monofilaments 14 of the web 12 may be made from any thermoplastic polymer that provides the desired properties of flexibility and resiliency when included in the device 10. The monofilaments 14 may be made of polyolefin (e.g., polyethylene, polypropylene, etc.), polyamide (e.g., Nylon), polyester, polyvinylhalide (e.g., polyvinylchloride (PVC), polyvinylidene chloride, polyvinyltetrafluoride, or polyvinylchlorotrifluoride), polystyrene, polyvinylester (e.g., polyvinyl acetate, etc.), or a mixture of two or more thereof.

The monofilaments 14 are extruded onto a substrate having the desired structural profile to form the web 12. The web 12 is preferably constructed in accordance with techniques well known to one of ordinary skill in the art, such as disclosed by, for example, U.S. Pat. Nos. 3,687,759; 3,691,004; and 4,212,692, the contents of all of which are hereby incorporated by reference in their entireties.

In one example, the monofilaments 14 may have an average diameter in the range of 0.25 millimeters to 6 millimeters, or in another example in the range of 0.50 millimeters to 5 millimeters, or in another example in the range of 0.75 millimeters to 4.5 millimeters, or in another example in the range of 1 millimeters to 4 millimeters.

In one example, the thickness of the web 12 may be in the range of about 0.05 inch to about 0.75 inch, or in another example, in the range of about 0.05 inch to about 0.25 inch. In a preferred embodiment, the thickness of the web 12 is about 0.125 inch.

The web 10 includes a top surface 16 and a bottom surface 18 oppositely disposed from the top surface 16. A pair of respective axes 20 are substantially orthogonal to one another, though the axes 20 may not be exactly orthogonal. In the depicted embodiment, the axes 20 are aligned such that the axes 20 are in a plane that is parallel to the top surface 16 and bottom surface 18.

A plurality of indentations 22 extend downwardly from the top surface 16 of the web 12. During the construction of the web 12, the plurality of indentations 22 may be formed by pressing the web 12 with a mold having the desired structural profile to form the plurality of indentations 22.

As depicted, each indentation 22 has a rectangular prism shape. In other embodiments, each indentation 22 may define any other suitable shape, such as having a cylindrical shape or having jagged or curved edges, rather than straight edges as depicted.

Each indentation 22 extends axially along the respective axes 20. As depicted, the plurality of indentations 22 have equal axial widths extending along each of the respective axes 20. In other embodiments, the axial widths of the plurality of indentations 22 may differ along each of the respective axes 20. In some embodiments, the axial width of one of the plurality of indentations 22 along one of the respective axes 20 may differ from the axial width of the one of the plurality of indentations 22 along the other of the respective axes 20. In one example, each indentation may have an axial width along each of the respective axes in the range of about 0.25 inch to about 4 inches, or in another example, in the range of about 0.5 inch to about 2 inches.

The plurality of indentations 22 are equally axially separated from one another along each of the respective axes 20. In other embodiments, the plurality of indentations 22 are unequally separated from one another along each of the respective axes 20. In one example, the axial distance along each of the respective axes 20 from one of the plurality of indentations 22 to another of the plurality of indentations is in the range of about 0.25 inch to about 4 inches, or in another example, in the range of about 0.5 inch to about 2 inches.

As shown, the plurality of indentations 22 have equal depths as measured from the top surface 16 of the web 12. In other embodiments, the plurality of indentations 22 have unequal depths as measured from the top surface of the web 12. As shown, the depth of one of the plurality of indentations 22 at a point along one of the respective axes 20 is equal to the depth of the one of the plurality of indentations at another point along the one of the respective axes 20. In some embodiments, the depth of one of the plurality of indentations 22 at a point along one of the respective axes 20 is unequal to the depth of the one of the plurality of indentations 22 at another point along the one of the respective axes 20.

As shown, the plurality of indentations 22 extend downwardly through a portion of the web 12. In other embodiments, the plurality of indentations 22 extend downwardly through the entire thickness of the web 12. In one example, each of the plurality of indentations has a depth in the range of 0.1 inch to 0.75 inch, or in another example, in the range of 0.1 inch to 0.5 inch.

Figure 4:
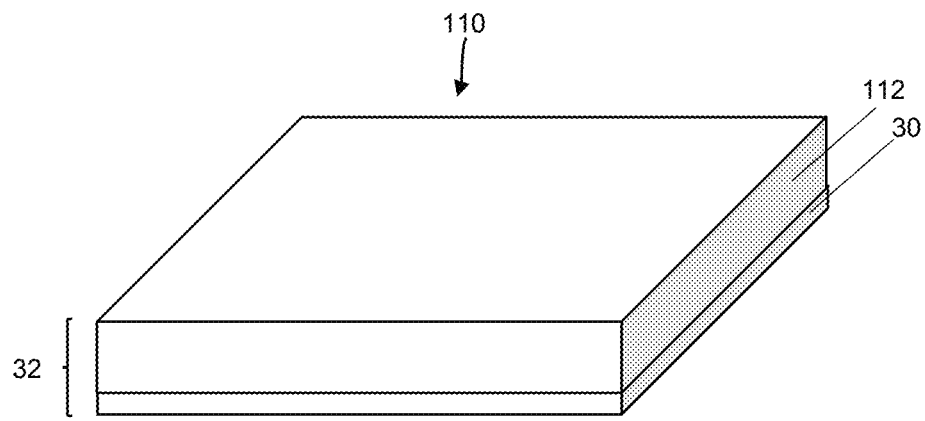
FIG. 4 is an oblique view of an embodiment of the device of FIG. 1, wherein the device includes a backing.

Referring to FIG. 4, the device 110 may further include a backing 30. The web 112 may be laid over the backing 30 in a free state during installation or the web 112 may be attached to portions of the backing 30 such that the web 112 and underlying backing 30 form a flexible unit 32 which facilitates the cutting of the web 112 to match the substrate layer (discussed below) and resists undesired displacement of the web 112 relative to the backing 30 during the placing and leveling of the mortar composition (discussed below). The web 112 may be thermally, adhesively or sonically bonded to the backing 30.

The backing 30 allows the web 112 to be thinner than a web without the backing because it prevents the extruded polymer monofilaments 14 (FIGS. 1-3) from becoming untangled. Conventional applications for floor protection are thick plastic and bituminous materials that weigh significantly more than the device 110.

In one example, the backing 30 may be made of a fabric, such as a plurality of fiberglass strands. A moisture resistant fabric would be advantageous because it would hold moisture while allowing breathing.

In another example, the backing 30 may be made of rubber, polyvinyl chloride, bitumen or a mixture of two or more thereof. Plastic or bituminous materials may be used for acoustic purposes.

Figure 5:
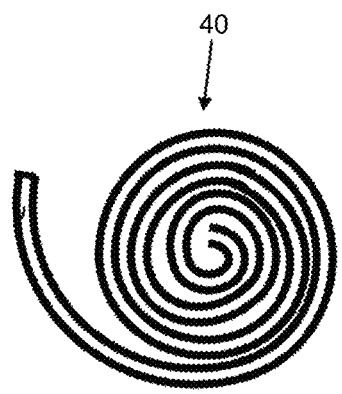
FIG. 5 is a perspective view of another embodiment of the device of FIG. 1, wherein the device is a roll material.

Referring to FIG. 5, the web 12 (FIGS. 1-3) is a roll material 40. The roll material 40 provides an easy to install pre-fabricated package in rolls that are lightweight, convenient to handle, easy to cut and fit with minimum waste. The roll material 40 is simple to unroll. The roll material 40 may be formed from the flexible unit 32 (FIG. 4).

In one example, the thickness of the roll material 40 may be in the range of about 0.05 inch to about 1 inch, or in another example, in the range of about 0.05 inch to 0.25 inch. In another example, the roll material 40 has an axial width extending along each of the respective axes 20 (FIGS. 1 and 2) in the range of about 5 feet to about 50 feet, or in another example, in the range of about 5 feet to about 35 feet, or in another example, in the range of about 5 feet to about 20 feet.

In some embodiments, the roll material 40 has at least one selvedge edge extending along one of the respective axes 20 (FIGS. 1 and 2). A selvedge edge may be used to bond two rolls side by side. A selvedge edge may be mortared flat to the substrate layer (discussed below) and then the adjacent strip may be mortared to the selvedge edge.

Figure 6:
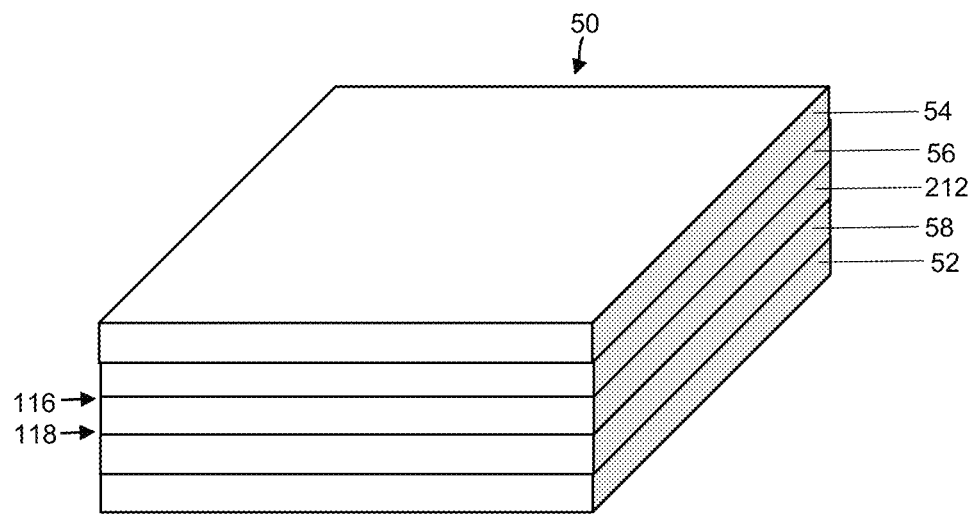
FIG. 6 is an oblique view of a mortar bed gauge system according to the disclosure.

Referring to FIG. 6, a mortar bed gauge system is shown at 50. As depicted, the system 50 includes web 212 having a top surface 116 and a bottom surface 118. The web 212 includes a plurality of indentations 22 (FIGS. 1-3). A substrate layer 52 faces the bottom surface 118 of the web 212. A finish layer 54 faces the top surface 116 of the web 212. A first mortar layer 56 is located between the web 212 and the finish layer 54. The first mortar layer 56 may be made of mortar and may adhere the finish layer 54 to the web 212.

In one example, the substrate layer 56 may be made of wood, concrete, or a combination thereof. In another example, the finish layer 54 may be made of tile, stone, porcelain, terracotta, or a combination thereof.

To provide mortar reinforcement and to additionally effect accurate gauging of the first mortar layer 56 when that mortar is placed onto the web 212, the web 212 has a uniform thickness (as measured from the top surface 116 to the bottom surface 118) preselected to correspond to a desired first mortar layer 56 thickness. Thus, a load bearing first mortar layer 56 of generally uniform thickness is readily formed as predetermined by the thickness of the web 212.

The thickness of the web 212 may be increased or decreased to match the potential substrate layer 52 deflection. The cone of bearing refers to the way the load is spread out from the top of the finish layer 54 in a horizontal stress to the substrate layer 52. A thicker first mortar layer 56 will bear greater weight and pass the load to the substrate layer 52 below over a greater area than a first mortar layer 56 with less thickness because the cone of bearing is greater at the bottom of a cone passing through a thicker first mortar layer 56.

Because a concrete substrate layer 52 can bear a greater load than a wood substrate layer 52, a thinner web 212 (e.g., 0.05 inch) may be sufficient to distribute the cone of bearing across the concrete substrate layer 52. A wood substrate layer 52 (e.g., plywood or oriented strand board) as is used in residential or multi-family construction may bend over time. Accordingly, the web 212 may need to be increased to four times the thickness of a web 212 used in conjunction with a concrete substrate layer 52 in order to distribute the cone of bearing across the substrate layer 52. A thicker web 212 will help limit the substrate layer 52 deflection.

The system 50 of the disclosure has advantages over a system that utilizes a web with no pattern of indentations. The plurality of indentations 22 (FIGS. 1-3) extending downwardly from the top surface 116 of the web 212 makes it easier to create a first mortar layer 56 with uniform thickness because the plurality of indentations 22 create a complete bond with the first mortar layer 56. Creating a complete bond between the plurality of indentations 22 and the first mortar layer 56 makes it easier to distribute the cone of bearing across the substrate layer 52.

Sufficient distribution of the cone of bearing helps with uncoupling the substrate layer 52 from the finish layer 54. The web 212 is designed to be free floating and prevents the bonding of the first mortar layer 56 to the substrate layer 52. Thus, the web 212 essentially separates and isolates (i.e., uncouples) the substrate layer 52 from the finish layer 54. The web 212 accordingly isolates the cracks and movement of the substrate layer 52 and thereby eliminates the transfer of such cracks or movement through and to the finish layer 54. Therefore, the resulting system 50 features a crack suppression membrane.

In some embodiments, the system 50 may include a small air pocket (not shown) for some level of void to help with uncoupling the substrate layer 52 from the finish layer 54.

As depicted in FIG. 6, the system 50 includes a second mortar layer 58 positioned between the web 212 and the substrate layer 52. The second mortar layer 58 may adhere the web 212 to the substrate layer 52.

In some embodiments, a mortar bed gauge method includes supplying the web 12 (FIG. 1, 2, or 3) of the present disclosure as described above and laying the web over the substrate layer 52 (FIG. 6). A first mortar layer 56 (FIG. 6) is placed onto the web 12 with the web 12 isolating the first mortar layer 56 from the underlying substrate layer 52 to form a mortar bed for supporting a finish layer 54. The amount of mortar in the first mortar layer 56 being placed on the web 12 is measured by the thickness of the web 12 of extruded polymer monofilaments 14 (FIG. 1, 2, or 3) and serves as mortar reinforcement and as a gauge to provide a predetermined mortar bed thickness corresponding to the preselected thickness of the web 12.

The supplying step may include supplying the web 12 (FIG. 1, 2, or 3) in roll form (roll 40 in FIG. 5) and the laying step may include unrolling the web 12 over the substrate layer 52 (FIG. 6) with the web 12 in direct surface-to-surface engagement with the substrate layer 52. The supplying step may include supplying the web 12 with a selvedge edge (not edge). The supplying step may include supplying the web 12 in roll form and unrolling the web 12 over the substrate layer 52 in side-by-side strips, and lapping adjacent web 12 strips to ensure a barrier isolating the first mortar layer 56 (FIG. 6) from the underlying substrate layer 52.

The laying step may include attaching the web 12 (FIG. 1, 2, or 3) to the substrate layer 52 (FIG. 6). The attaching step may include stapling the web 12 to the substrate layer 52 formed of wood. The attaching step may include fixing the web 12 by adhesive to a substrate layer 52 formed of concrete. The attaching step may include placing a second mortar layer 56 (FIG. 6) onto the substrate layer 52 and laying the web 12 over the second mortar layer 56 to form a bond between the substrate layer 52 and the web 12.

The method may further include the step of cutting the web 12 (FIG. 1, 2, or 3) to fit the underlying substrate layer 52 (FIG. 6) before the placing step.

The method may include after the placing step the further steps of packing the first mortar layer 56 (FIG. 6) into the web 12 (FIG. 1, 2, or 3), leveling the first mortar layer 56 with a trowel, and then curing the first mortar layer 56. The method may include the further steps of packing the first mortar layer 56 into the web 12, and leveling the first mortar layer 56 with a straight edge to match the thickness of the web 12.

The leveling step may include correcting uneven surfaces by adding and leveling supplemental mortar to the first mortar layer 56 (FIG. 6).

The method may further include the step of installing the finish layer 54 (FIG. 6) onto the first mortar layer 56 (FIG. 6) after the first mortar layer 56 is cured.

The present disclosure provides a mortar bed gauge device 10, system 50, and method that create a predetermined mortar bed thickness. The mortar bed gauge device 10 includes a web 12 of extruded polymer monofilaments 14 having indentations 22 on a surface 16e of the web 12. The mortar bed gauge system 50 includes the web 212 located between a substrate layer 52 and a finish layer 54. The mortar bed gauge method includes supplying the web 212, laying the web onto the substrate layer 52, placing a mortar composition onto the web 212, and measuring the amount of composition being placed on the web 212 by the thickness of the web 212.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mortar bed gauge system comprising:
a web of extruded polymer monofilaments having top and bottom oppositely disposed surfaces and a pair of respective axes substantially orthogonal to one another and extending in a plane parallel to the top and bottom oppositely disposed surfaces, the polymer monofilaments being heat welded at junctions to form a matrix of tangled monofilaments;
a plurality of discrete, mortar receiving indentations surrounded by an interlocking grid, the indentations extending downwardly from the top surface of the web and along the respective axes, wherein the axial width of each of the plurality of indentations along each of the respective axes is in the range of 0.5 inch to 2 inches;
a substrate layer facing the bottom surface of the web, the substrate layer being made of a material selected from wood, concrete, or a combination thereof;
a finish layer facing the top surface of the web, the finish layer being made of a material selected from tile, stone, porcelain, terracotta, or a combination thereof; and
a first mortar layer located between the web and the finish layer.

2. The system of claim 1, wherein the polymer monofilaments are made of a material selected from polyolefin, polyamide, polyester, polyvinylhalide, polystyrene, polyvinylester, or a mixture of two or more thereof.

3. The system of claim 1, wherein the polymer monofilaments are made of a material selected from polyethylene, polypropylene, or a mixture of two or more thereof.

4. The system of claim 1, wherein the polymer monofilaments have an average diameter in the range from 1 mil to 4 mils.

5. The system of claim 1, wherein the web has a thickness in the range of 0.05 inch to 0.25 inch.

6. The system of claim 1, wherein the plurality of indentations has equal axial widths extending along each of the respective axes.

7. The system of claim 1, wherein each indentation of the plurality of indentations is equally axially separated from one another along each of the respective axes.

8. The system of claim 1, wherein an axial distance along each of the respective axes from one of the plurality of indentations to another of the plurality of indentations is in the range of 0.5 inch to 2 inches.

9. The system of claim 1, wherein the plurality of indentations has equal depths.

10. The system of claim 1, wherein each of the plurality of indentations has a depth in the range of 0.1 inch to 0.5 inch.

11. The system of claim 1, wherein the web further comprises a backing layer at an interface with the substrate layer.

12. The system of claim 11, wherein the backing layer comprises a fabric.

13. The system of claim 12, wherein the fabric comprises a plurality of fiberglass strands.

14. The system of claim 11, wherein the backing layer comprises rubber, polyvinyl chloride, bitumen, or a mixture of two or more thereof.

* * * * *